Figure 1:
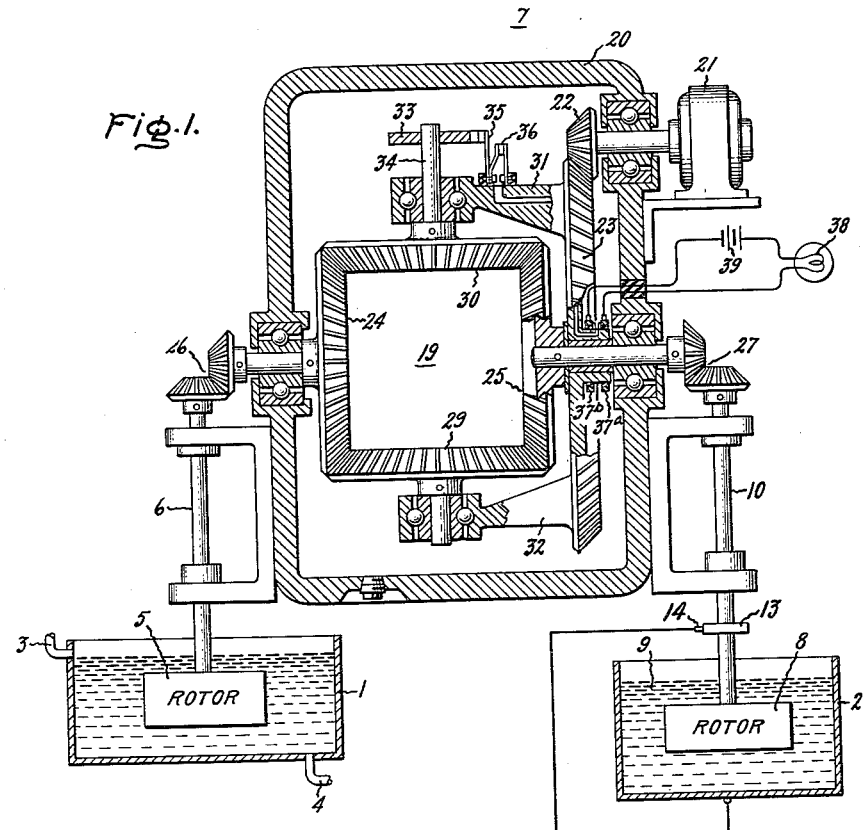

March 5, 1963　　F. W. VAN LUIK, JR　　3,079,787

VISCOMETER

Filed Oct. 30, 1959

Inventor:
Frank W. Van Luik, Jr.,
by J. David Blumenfeld
His Attorney.

# United States Patent Office 3,079,787
Patented Mar. 5, 1963

3,079,787
VISCOMETER
Frank W. Van Luik, Jr., Schenectady, N.Y., assignor to General Electric Company, a corporation of New York
Filed Oct. 30, 1959, Ser. No. 849,795
5 Claims. (Cl. 73—59)

This invention relates to an apparatus for measuring viscosity and more particularly to an electrically controlled null balancing viscometer.

Although the instant invention is described in connection with viscosity measurements of simple Newtonian fluids, it will be understood that the invention is equally pertinent to viscosity measurements of non-Newtonian materials which, unlike Newtonian fluids, are characterized by viscosities varying with flow, mechanical working, etc.

Heretofore, one of the well known schemes of measuring viscosity consisted of immersing a rotating member in the fluid to be measured and determining the viscous drag on the rotating member in terms of the angular displacement of a spring member. It is evident that this scheme, and the apparatus associated therewith, is complicated, requires constant adjustment of the apparatus, and is not well-suited to manipulation by an unskilled operator.

Another well known prior art viscometer construction contemplates immersing rotating elements in the fluid to be tested and in a fluid of a known viscosity. A constant driving torque is applied to the rotating elements and the difference in their speeds is an indication of the difference in viscosity of the test fluid and the known standard fluid. Such an instrument, although satisfactory for many purposes, is also quite complicated and requires a skilled operator to obtain meaningful and consistent results. Furthermore, since the speed differential is measured to determine the viscosity, different driving torques, different sized rotating members or wide ranges of viscosities affect the speed and continuous re-calibration of the instrument is necessary if a range of viscosities is to be measured by a single instrument. In addition, the sensitivity of such an instrument is limited and small viscosity changes cannot be detected and measured.

It is an object of this invention therefore to provide an apparatus for continuously measuring and indicating the viscosity of a fluid.

Another object of this invention is to provide a novel viscometer apparatus which is rugged, accurate, and may be operated by an unskilled operator.

One manner of enhancing the sensitivity of a viscometer device is by a null balancing arrangement in which the viscosity of a reference fluid is varied until a null balance is achieved. In such a null balancing arrangement even very minute viscosity variations will produce a magnified deviation from the null balance condition which may be sensed and corrected.

It is yet another object of this invention, therefore, to provide a null balancing viscometer.

Still another object of this invention is to provide an electrically controlled null balancing viscometer.

Other objects and advantages of the invention will become apparent as the description thereof proceeds.

The foregoing objects are achieved by immersing one rotating member in the fluid to be tested and another in a reference fluid which is characterized by the fact that its viscosity may be varied by means of applied electric or magnetic fields. A constant driving torque is transmitted to the two rotating members so that their respective rotational speeds are directly related to the viscosity of the fluids. Any speed differential is sensed as an indication of a viscosity difference and the electric or magnetic field across the reference fluid is varied until the speed of the two rotors is equal. The magnitude of the electric or magnetic field required to equalize the viscosity of the fluids is then an indication of the viscosity of the fluid under test.

In a more sophisticated version the differential speed of the two rotors is measured and automatically controls the applied field to produce a self-balancing device. In addition, the novel viscometer may also be automated for industrial process applications by having the self-balancing viscometer produce an output control signal which may be utilized for controlling the viscosity of the fluid under test.

Figure 2:
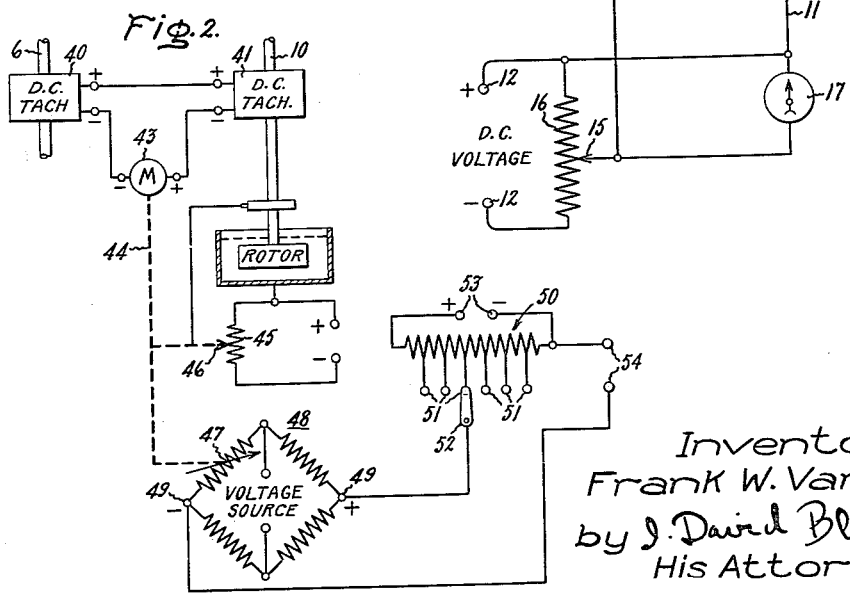

Some of the novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIGURE 1 represents an embodiment of a viscometer constructed in accordance with the invention; and FIGURE 2 is a schematic illustration of a self-centering and automated version of the novel viscometer.

Referring now to FIGURE 1, a viscometer constructed in accordance with the invention is illustrated and includes a container 1 to hold the fluid to be measured and a container 2 to hold a reference fluid of variable viscosity. Fluid is supplied to the tank 1 through inlet conduit 3 and is removed through an outlet conduit 4. A movable member such as the rotor 5 secured to a drive shaft 6, is immersed in the fluid to be measured and has fixed torque impressed thereon from a driving means illustrated generally at 7 causing it to rotate in the fluid. The viscous drag on the rotor 5 is compared to the viscous drag on a similar rotor member 8 immersed in a field responsive variable viscosity reference fluid 9 in the container 2. The member 8 is similarly secured to a drive shaft 10 and is driven from the same driving means 7 so that the driving torques applied to the two rotors are identical and the speed of rotation is directly related to the differences in the viscosities of the two fluids.

The fluid 9 is characterized by the fact that its viscosity may be varied by applied electric or magnetic fields to vary the viscous drag on the rotor 8 until it equals that on the rotor 5 and the two are rotating at the same speed. To this end, the container 2 is shown connected to a variable source of direct current voltage to establish a variable electrostatic field across the fluid and control the viscosity of the fluid. The container 2 is connected by a lead 11 to the upper one of a pair of terminals 12 connected to a source of direct current voltage, not shown. To complete the circuit a slip ring 13 is mounted on the shaft 10 and is connected through a sliding brush 14 and a suitable lead to the movable slider 15 of a potentiometer energized from terminals 12. Movement of the slider 15 along potentiometer 16 varies the electrostatic field across the fluid 9 and controls its viscosity. A voltage measuring device such as the direct current voltmeter 17 is connected between the upper terminal 12 and the movable slider 15 to measure the voltage required to balance the viscosities and may be calibrated directly in viscosity units (i.e., poise).

As has been pointed out, the rotating members 5 and 8 are arranged to be driven with the same driving torque but in such a manner that they may rotate differentially with respect to each other in the event that the unknown fluid and the reference fluid are of different viscosities. Any speed differential between these rotors indicates a difference in viscosity so that the operator may then vary the electric field across the reference fluid 9 until the speed differential is reduced to zero.

In order to provide such a differential rotation the driving means 7 includes a mechanical differential device 19 positioned in a housing 20 through which equal driving torques are impressed upon the two rotating members.

The differential device 19 is driven by a synchronous motor 21 through a bevel gear 22 and a drive ring 23 so that the torque from the motor 21 is transmitted to members 5 and 8. The member 21 is energized from a 3-phase alternating current circuit, not illustrated, or in any other suitable manner to provide power for driving the said motor.

The differential device 19 is shown schematically as comprising a pair of bevel gears 24 and 25 which drive members 5 and 8 respectively, through bevel gears 26 and 27 and drive shafts 6 and 10. A pair of differential gears 29 and 30 engage the bevel gears 24 and 25 and are rotatably mounted in a pair of ball bearings secured in arms 31 and 32 attached to the drive ring 23. Rotation of the drive ring 23 causes the entire differential assembly 19 to revolve about the axis of drive ring 23 rotating the bevel gears 24 and 25 and transmitting equal driving torques to members 5 and 8 through drive shafts 6 and 10. As long as the fluids in the respective containers have the same viscosity, members 5 and 8 are rotated at the same speed and the differential gears 29 and 30 do not rotate about their axes of rotation. If viscosity of the fluids is not equal, the viscous drag and, hence, the speed of the two rotors is not equal, causing differential gears 29 and 30 to rotate at an angular velocity proportional to this difference.

In order to indicate to the operator that the two rotors are rotating at different speeds so that he may vary the field across the reference fluid 9, a visual speed differential indicating means is provided. A cam 33 having a plurality of lobes, only one of which is shown, is secured to shaft 34 of differential gear 30 and during each rotation urges a flexible armature member 35 against a contact 36 to close an energizing circuit for an external indicating lamp 38. Lamp 38 is connected through a battery 39, a brush and slip ring assembly 37a, and a suitable lead to the armature 35. Whenever armature 35 is urged against the contact 36, which is connected by a suitable lead and a second brush and slip ring assembly 37b to the other side of the lamp 38, an energizing circuit is completed for the lamp 38 causing it to light until movement of cam 33 again interrupts the circuit. Thus each rotation of the differential gear 30 about its own axis produces a fixed number of light flashes per revolution. The operator then adjusts the movable slider 15 to vary the viscosity of the reference fluid 9 until the flickering of the lamp 38 can no longer be observed at which time the two rotors are rotating at the same speed and the viscosity of the unknown fluid may be obtained directly from the voltmeter 17 calibrated in viscosity units (i.e., poises).

It will be apparent to those skilled in the art that where a reference fluid which is responsive to a magnetic field is utilized, a magnetic field must be established across the fluid 9 in the container 2. This magnetic field may be generated in any number of well known ways. However, one scheme which comes immediately to mind would include an electromagnet having a pair of core pole faces positioned adjacent the container 2 to establish the magnetic field across the fluid. A coil positioned in flux exchange relationship with the core is connected to a current source which is manually varied by the operator to control the ampere turns and hence the magnetic field.

The field responsive variable viscosity fluid is characterized by the fact that an electrostatic or an electromagnetic field varies the viscosity of the fluid. Such field responsive fluids consist generally of a mixture of a liquid laden with solid or semi-solid particles which, when entrained in the fluid, respond to the field by each particle associating with its neighbor in shear resistant chains, resulting in a pronounced apparent increase in the viscosity of the mixture. If the applied field is magnetic, the particles must be, to some extent at least, magnetically conductive and if the applied field is electric, the particles must to some extent be electrically conductive or have a dielectric constant many times greater than that of their entraining fluid. Thus the individual particles are capable of simultaneously carrying opposite electric charges.

Typical examples of such field responsive fluids are:

MAGNETIC FIELD RESPONSIVE

Example 1

| | |
|---|---:|
| Carbon carbonyl iron powder (0.1 to 1 microns) _____grams__ | 500 |
| Light weight mineral oil (viscosity of 2–10 centipoises) _____cc__ | 50 |
| Aluminum tristearate_____gram__ | 0.4 |
| Aluminum distearate_____do____ | 1.8 |

The aluminum tri- and distearate are heated with the oil to effect solution before adding the iron powder and, after the ingredients have all been brought together, they are thoroughly mixed to provide a uniform dispersion throughout the mass.

Example 2

| | Grams |
|---|---:|
| Lithium stearate_____ | 3 |
| Lithium ricinoleate_____ | 7 |
| Phenyl alpha naphthylamine_____ | 0.5 |
| Light weight mineral oil (viscosity of 2–10 centipoises) _____ | 90 |

The above ingredients are heated to form a light grease, which is then added to 1200 grams micron sized carbonyl iron powder with thorough mixing to provide a uniform dispersion throughout the mass. The carbonyl iron powder is a stable article of commerce in its spherical form having size ranges from 0.1 to 10 microns in diameter. Of these, the size range of 0.1 to 1.0 microns is preferred although sizes up to 10 microns are operative.

The employment of dispersing agents such as the fatty acid salts and esters of the foregoing examples is based on the fact that with their presence the induced shear resistance of the fluid will correspond to and follow with high fidelity the varying magnitudes of the applied field.

ELECTRIC FIELD RESPONSIVE

Example 1

| | |
|---|---:|
| Dry ground silicon gel (about 0.1 to 1.0 micron particle diameter)_____grams__ | 100 |
| Sorbitol sesquioleate ("arlacel C")_____cc__ | 15 |
| Kerosene _____cc__ | 50 |
| Lauryl pyridinium chloride_____grams__ | 1.1 |
| Ethylene glycol mono-ethyl ether ("Cellosolve") _____cc__ | 3.3 |
| White tin oxide (stannic)_____grams__ | 5 |

The sorbitol sesquioleate, kerosene and lauryl pyridinium chloride are heated to effect solution and the remaining ingredients are then added with thorough mixing to obtain uniform dispersion throughout the fluid.

Example 2

| | |
|---|---:|
| Dry ground silical gel (about 0.1 to 1.0 micron particle diameter)_____grams__ | 100 |
| Sorbitol sesquioleate ("arlacel")_____cc__ | 15 |
| Sodium borate (borax)_____gram__ | 1 |
| Concentrated water glass coloid or solution_____cc__ | 3 |
| Water _____cc__ | 12 |
| Kerosene _____cc__ | 50 |

The kerosene, sorbitol sesquioleate, and borate are heated to effect solution, the water is then added with agitation to form an emulsion, and the other ingredients are then thoroughly mixed in to provide uniform dispersion throughout the fluid.

For additional details, and a more thorough discussion of the theory, and functioning of such field responsive fluids, reference is made to Patent No. 2,661,825—W. M. Winslow, issued December 8, 1953, filed January 7, 1949.

It is impossible, and in fact not desirable, to attempt a comprehensive catalog of all the material combinations and permutations which may be utilized to produce a field responsive mixture which may be utilized in the particular device described in the instant application. The invention lies in the recognition that field responsive fluids of various types may be utilized in a null balancing viscometer. It will be understood that many such field responsive fluid mixtures may be formulated, by those skilled in the art, now or in the future, which fall within the teaching herein contained, and hence any attempt to include a comprehensive catalog of such fluid mixtures is of little or any use and would merely be cumulative.

The novel viscometer construction of FIGURE 1 illustrates a manually operated device in which the operator varies the field across the field sensitive reference fluid until the speeds of the two rotors are equal at which time the viscosity of the fluid may be determined by measuring a field producing parameter such as voltage. It will be apparent, however, that the null balancing viscometer illustrated in FIGURE 1 may quite easily be modified to produce a self-balancing arrangement in which a speed differential sensing device is utilized to drive the movable wiper of the potentiometer in a direction such that the viscosities, and hence the rotors speeds are automatically equalized. In addition, the viscometer may also be so modified that an output control signal is produced which may be utilized in an automated process line to control the viscosity of the fluid to be tested automatically.

FIGURE 2 illustrates, schematically, such a modified construction and shows a pair of D.C. tachometers 40 and 41 mounted respectively on the rotor drive shafts 6 and 10. The tachometers 40 and 41 are driven by the shafts and produce at their output terminals D.C. voltages proportional to the rotational speed of the respective shafts. The output from these tachometers are applied in opposition to a variable speed reversible drive motor 43 which rotates in a direction depending on the relative magnitudes of these output signals. That is, tachometers 40 and 41 are so connected that their positive terminals are directly connected whereas their negative terminals are connected to supply the energizing voltage for the motor 43. Thus, if the two shafts 6 and 10 are rotating at the same speed the output from the tachometers are equal and hence the voltage appearing at the input terminals of motor 43 is the same and the voltage difference across the motor is zero and the motor does not rotate. In the event that shaft 6 is rotating faster than shaft 10, the output from the tachometer 40 is greater than that from the tachometer 41 and the tachometer 40 terminal is more negative than the tachometer 41 terminal and the relative polarity of the energizing voltage appearing across the motor 43 is that indicated by the plus and minus sign in FIGURE 2. In the event that shaft 10 is rotating faster than shaft 6, the output at the negative terminal of the tachometer 41 is greater than that at the negative terminal of the tachometer 40 is greater than that at the negative terminal of the tachometer 40 and hence the polarity of the energizing voltage applied to the motor 43 is reversed, reversing the direction of rotation of the motor. The motor 43 drives an output shaft 44 and a movable slider 46 on a potentiometer 47 to vary the field applied to the reference fluid until the two shafts are rotating at the same speed and the outputs from their respective tachometers are equal deenergizing motor 43.

Shaft 44 also actuates a bridge circuit to produce an output signal which may be utilized in an automated process line to control the viscosity of the fluid to maintain its viscosity at a predetermined level. The output shaft 44 is connected to a variable resistance 47, connected as one arm of a bridge circuit 48, to vary the balance condition of the bridge and produce a signal at the bridge output terminals 49 which is proportional to the viscosity of the measured fluid. This viscosity signal is compared to a reference signal representative of the desired viscosity of the fluid which reference signal is preset manually by an operator or programmed automatically.

A movable wiper arm 52 is connected to one of the output terminals 49 of the bride and is adapted to engage one of a plurality of taps 51 on a potentiometer 50. Potentiometer 50 is energized from the input terminals 53 with a polarity indicated by the plus (+) and minus (−) signs so that the two voltages are continuously subtracted. The magnitude of the reference signal from the potentiometer 50, representing the desired viscosity of the measured fluid, may be varied manually by moving the wiper arm 52 to any one of the plurality of taps 51 so that the reference voltage may be varied selectively in accordance with a predetermined desired viscosity level for the fluid. Since the voltages are continuously subtracted, the magnitude and polarity of the resultant output signal at the terminals 54 represents the difference between the actual viscosity of the fluid being tested and the desired viscosity. The signal appearing at terminals 54 may then be utilized to actuate control valves, mixing tanks, etc., to manipulate the viscosity of the measured fluid until it attains the desired value.

Thus the apparatus illustrated in FIGURE 2 not only provides a self-centering null balancing viscosity measuring instrumentality but also provides a feedback signal for continuously comparing the viscosity of the measured fluid with a predetermined reference viscosity and controlling the process to bring the measured fluid to desired viscosity.

While a number of particular embodiments of this invention have been shown it will of course, be understood that it is not limited thereto since many modifications of the arrangement of the construction may be made. It is contemplated by the appended claims to cover any such modifications as fall within the true spirit and scope of this invention.

What I claim as new and desire to secure by Letters Patent of the United States is:

1. In a null balancing viscosity measuring apparatus, the combination comprising a pair of movable elements adapted to be immersed respectively in a fluid whose viscosity is to be measured and in a "field responsive reference fluid," the viscosity of said reference fluid being variable with applied field, drive means operatively associated with said elements for moving said elements in said fluids at speeds determined by their relative viscosities, and means to vary the viscosity of the reference fluid until the viscosities of the respective fluids and the speed of said elements are equal, said last named means including means to establish a variable field across said reference fluid.

2. In an apparatus for measuring viscosity, the combination comprising a rotating element adapted to be immersed in a fluid whose viscosity is to be measured, a further rotating element adapted to be immersed in a reference fluid having a viscosity varying with applied electric field, driving means for rotating said elements respective at speeds determined by the relative viscosity of said fluids, and means to vary the viscosity of said reference fluid including means to produce a varying electric field across said reference fluid until the viscosity of said reference fluid equals that of the fluid to be measured and said rotating elements rotate at the same speed.

3. In an apparatus for measuring viscosity, a pair of rotating members adapted to be immersed respectively in a "field responsive reference fluid" and in a fluid whose viscosity is to be measured, drive means operatively associated with said members for rotating said members in said fluids including a differential transmission means for transmitting equal torques to said members and producing a rotation proportional to any speed difference between said members due to a difference in the viscosities of said fluids, speed indicating means operatively associated with said differential transmission means for indicating the presence of said speed difference, variable field producing means effectively coupled across said reference fluid to vary the viscosity of the reference fluid until the viscosities of the fluids and the speed of said elements are equal, and means responsive to said means for varying the viscosity of the reference fluid to indicate the viscosity of said reference fluid.

4. The apparatus of claim 3 wherein the variable field producing means to vary the viscosity of the reference fluid includes means to establish a variable electric field across said reference fluid.

5. In an apparatus for measuring viscosity, a pair of rotating members adapted to be immersed respectively in a reference fluid and a fluid whose viscosity is to be measured, drive means operatively associated with said members for rotating said members in said fluids including transmission means for transmitting equal torques to said members whereby they rotate at speeds determined by the relative viscosities of said fluids, sensing means for sensing the difference in speed of said members, means to vary the viscosity of said reference fluid including means to establish a variable electric field across said reference fluid, and means coupled to said sensing means to vary the field across the said reference fluid in response to the speed differential of said rotating members until the viscosities are equal and the speeds of said rotating members are equal.

References Cited in the file of this patent
UNITED STATES PATENTS

| | | |
|---|---|---|
| 2,280,947 | Gulliksen | Apr. 28, 1942 |
| 2,630,707 | Tyler | Mar. 10, 1953 |
| 2,661,825 | Winslow | Dec. 8, 1953 |
| 2,667,237 | Rabinow | Jan. 26, 1954 |